Dec. 10, 1957  M. C. FERRE  2,815,577
CABLE MEASUREMENTS
Filed July 30, 1956  2 Sheets-Sheet 1

INVENTOR.
MAURICE C. FERRE
BY
William R. Sherman
HIS ATTORNEY

Dec. 10, 1957  M. C. FERRE  2,815,577
CABLE MEASUREMENTS
Filed July 30, 1956  2 Sheets-Sheet 2
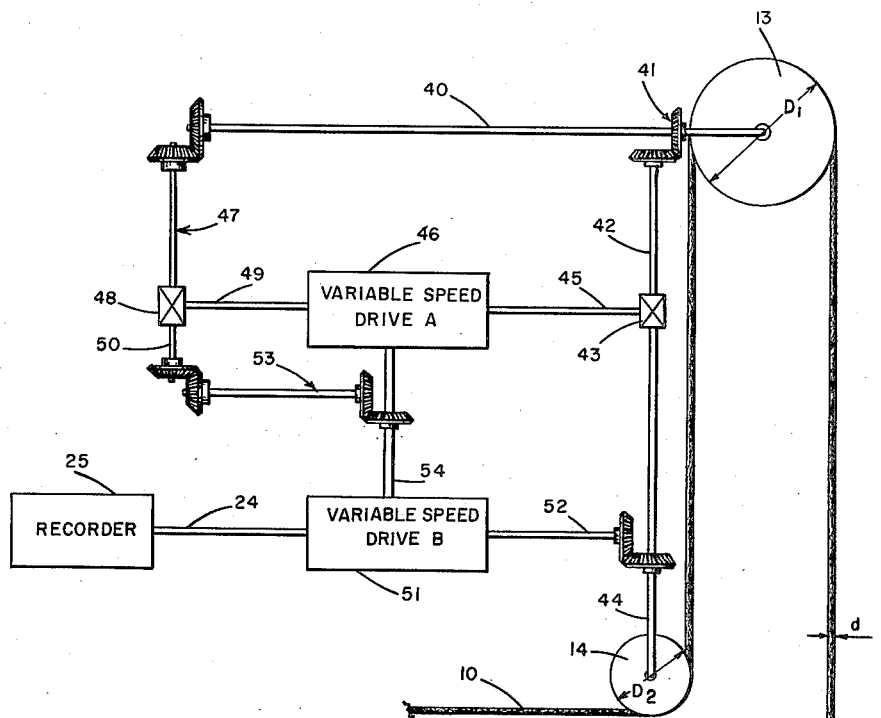
FIG. 3
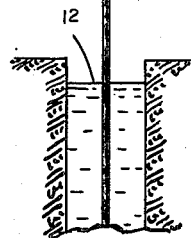
INVENTOR.
MAURICE C. FERRE
BY
HIS ATTORNEY

United States Patent Office 2,815,577
Patented Dec. 10, 1957

2,815,577

CABLE MEASUREMENTS

Maurice C. Ferre, Ridgefield, Conn., assignor, by mesne assignments, to Schlumberger Well Surveying Corporation, Houston, Tex., a corporation of Texas Application July 30, 1956, Serial No. 600,981

12 Claims. (Cl. 33—133)

The present invention relates to measuring devices and methods and, more particularly, to devices and methods for measuring the length or movement of elongated linear articles such as wire, cable or the like in their lengthwise direction.

In the use of linear articles such as cable, wire, cord, ribbon or the like, measurement of the length or of lengthwise movement of such articles is commonly required. For example, in the use of electric cable or wire line in many well services, the length of such cable or wire line in the well must be known with a high degree of precision in order that a tool suspended therefrom may be located accurately at a given depth. For this purpose, linear measurement must be made for both directions of travel of the cable or wire line and an indication derived of the net travel past the point of measurement.

Quite commonly, a measuring wheel and associated counter are employed for obtaining linear measurements of cable or the like. Usually the type of measuring wheel in which tangential contact is maintained between the linear article and the wheel is employed. One deficiency in obtaining accurate measurements with such tangential-type measuring wheels has been slippage between the article and the measuring wheel so that angular movement of the wheel does not correspond exactly to linear movement of the article. Furthermore, since only tangential contact with the wheel is maintained by the cable or the like, the torque developed on the shaft of the wheel is usually small. It may, therefore, be difficult to drive a remote counter mechanism by torque from the shaft.

One method to reduce slippage and give greater torque to the shaft operating the counter is to run the cable or the like over a single sheave, thereby maintaining contact over an arc of, say, 90° to 180°. But in this system, variations in cable diameter give rise to errors, and corrections must be made for the expansion and contraction of the sheave due to temperature changes.

Accordingly, it is an object of this invention to provide new and improved methods and apparatus for the linear measurement of linear articles such as cable or the like with a high accuracy.

A further object of this invention is to provide such new and improved methods and apparatus for measuring linear articles whereby a relatively large torque is made available for producing remote indications.

Another object of this invention is to provide new and improved methods and apparatus for the linear measurement of cable or the like which are substantially free from errors arising from variations in cable diameter.

Yet another object of this invention is to provide such methods and apparatus which are substantially free from errors arising from variations in sheave diameter due to temperature changes.

These and other objects are attained by passing cable or the like successively over two calibrated sheaves of different diameters and computing the length in accordance with the rotation of the sheaves. For each sheave, the rotation depends upon the length of the cable passed thereover, the diameter of the sheave, and the diameter of the cable. Since the length of cable passing over the two sheaves is the same and the sheave diameters are fixed by design, the rotation of the sheaves may be combined to eliminate dependence upon the cable diameter. By so combining the sheave rotations to represent the length of cable measured, the measured length is made dependent upon the difference in the sheave diameters. Substantially perfect temperature compensation is obtained by constructing the sheaves of metals, and choosing metals having temperature expansion coefficients which have a ratio substantially the same as the ratio of the sheave diameters. Means may be employed to provide an indication varying with the rotation of the sheaves to represent the measured length.

In one embodiment of the invention, the length of cable measured by the two sheaves is indicated continuously in accordance with the output of a differential driven mechanically by the two sheaves. In another embodiment, the rotations of the sheaves are manifested by electrical and mechanical signals, respectively, which are applied to a differential generator to produce an output signal representing the measured length. A third embodiment employs computer means including variable speed drives which are arranged for a rigorous computation of the exact length.

These and other features of the invention may be more fully understood by referring to the accompanying drawings, in which:

Fig. 3 is a diagrammatic representation of a third embodiment of the invention utilizing a mechanical computer arranged for a rigorous computation of cable length.

Figure 1:
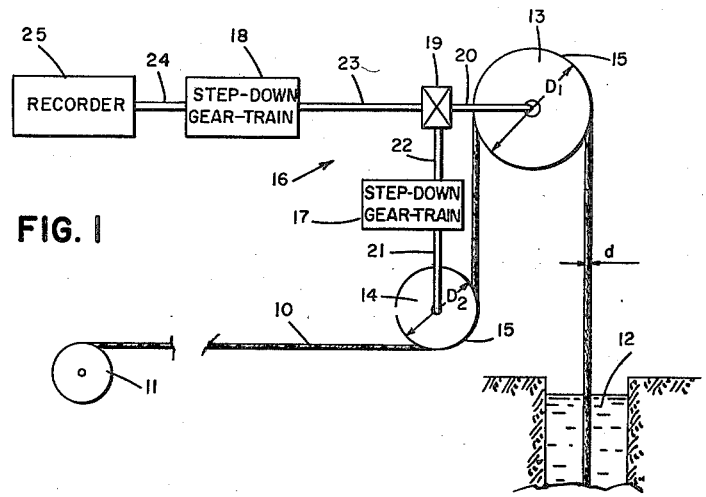
Fig. 1 is a diagrammatic representation of an embodiment of the present invention using a mechanical computer to compute the cable travel or length.

While the method and apparatus of this invention are capable of measuring a great variety of elongated linear articles such as rope, wire, ribbon and the like, their utility is here illustrated by the measurement of armored cable 10 wound and unwound from a drum or winch 11, the free end of the cable being lowered into a borehole 12, for example, to support well logging apparatus (not shown). The measuring device in accordance with the present invention comprises a first measuring wheel or sheave 13 of relatively large diameter and a second measuring wheel or sheave 14 of relatively small diameter. Cable 10 is unwound from drum or winch 11 and is passed successively over each sheave before entering borehole 12. The sheaves are mounted in any desired manner on the well derrick or are supported on the ground or on a winch truck, for instance. The sheaves may be arranged relative to each other as shown in Fig. 1 or in any convenient manner such that cable 10 has substantial arcual contact with each sheave, as, for example, through an arc of at least 30° whereby slippage is negligible.

The length of cable represented by the rotation of each sheave depends on the diameter of the sheave and of the cable. To obtain an accuracy of at least 1 part in 10,000, as may be required in well servicing, variations in cable diameter from one cable to another or along a given cable due to cable wear must be accounted for. Likewise, temperature variations cause expansion and contraction of metallic parts of the measuring device and should be compensated. The present invention eliminates the inaccuracies resulting from variable cable diameter and also those resulting from the effect of temperature variations.

The number of turns N of sheave 13 or 14 resulting when a length L of cable 10 has ridden over that sheave depends on the diameter D of the sheave and the diameter $d$ of the cable. Hence, the number of turns N made by the sheave is a measure of the length L in accordance with the general expression:

(1) $$L = \pi(D+d)N$$

For two sheaves, such as large sheave 13 and small sheave 14, having unequal diameters $D_1$ and $D_2$, respectively, the two relations for the same length L of cable passing over each sheave are:

(2) $$L = \pi(D_1+d)N_1$$

and (3) $$L = \pi(D_2+d)N_2$$

where $N_1$ and $N_2$ are the respective turns of sheaves 13 and 14.

The diameter $d$ of the cable may be eliminated algebraically by combining the two equations above, yielding a simple relationship between the length L of cable measured, the diameters $D_1$, $D_2$ of the two sheaves, and the number $N_1$, $N_2$ of turns made by each sheave. This relationship for the exact length L is:

(4) $$L = \pi(D_1 - D_2) \frac{N_1 N_2}{N_2 - N_1}$$

As will be hereafter explained, advantage is taken of the fact that the diameters enter into the equation only through their difference to provide a perfect temperature compensation.

Since the factor $(D_1 - D_2)$ of expression (4) is constant, the ratio $$\frac{N_1 N_2}{N_2 - N_1}$$

may be computed automatically or manually to yield the measured length L. However, the computation may, at the present time, be made more expediently in accordance with an approximation of relationship (4) using the computer of this invention for length measurements having an accuracy sufficient for well servicing work. Of course, a computer which computes the exact length L according to expression (4) may be used, and a typical embodiment of such a computer will be described hereafter.

Assuming that cable 10 with an original diameter $d$ of 0.5 inch, for example, is worn to an average diameter $d$ of 0.48 inch after a number of operations, the ratio K of the number of turns of the large and small sheaves 13, 14 is given by the expression:

(5) $$K = \frac{D_1 + \bar{d}}{D_2 + \bar{d}} = \frac{\bar{N}_2}{\bar{N}_1}$$

K is thus a constant characteristic of the sheaves and of average cable diameter $\bar{d}$.

An approximation of the length of cable passing over two sheaves of unequal diameter, ignoring the variation of diameter of the cable, is:

(6) $$L_1 = \pi(D_1 + \bar{d})N_1$$

and (7) $$L_2 = \pi(D_2 + \bar{d})N_2$$

$L_1$ and $L_2$ are both in error and may be smaller or larger than the true length L, depending on whether the average diameter $\bar{d}$ for the portion of cable measured is smaller or larger than the actual diameter $d$ for that portion of the cable, but the errors are approximately in proportion to the inverse of the diameters of the sheaves, i. e. the smaller sheave will give an error larger than that of the larger sheave.

The approximations expressed by Equations 6 and 7 and the ratio defined by Equation 5 may be substituted into the exact expression (4) to give an approximate length L' as follows:

(8) $$L' = \frac{KL_1 - L_2}{K - 1}$$

This approximation ignores the variations in cable diameter and gives an approximate length sufficiently accurate for well logging and servicing purposes. To convert Equation 8 for L' to a form more susceptible to automatic computation, Equations 2 and 3 giving the lengths measured by the first and second sheaves are substituted into Equation 8 giving:

(9) $$L' = \pi(D_1 + \bar{d}) \left[ \frac{N_1 - \dfrac{N_2}{K^2}}{1 - \dfrac{1}{K}} \right]$$

The error resulting from the approximation may be ascertained by replacing $L_1$ and $L_2$ in Equation 8 by the values given in Equations 6 and 7 and comparing the resultant expression with exact Equation 4. The relative error is:

(10) $$\frac{L - L'}{L} = \frac{(d - \bar{d})^2}{D_1 D_2}$$

Using one sheave, that of diameter $D_1$, the relative error is $$\frac{d - \bar{d}}{D_1}$$

It is therefore apparent that by using two sheaves, this possible relative error is decreased by a factor $$\frac{d - \bar{d}}{D_2}$$

To show that the error as given by Equation 10 is small enough for well logging and servicing work, an illustrative set of data will be given. Assume that the large sheave has a diameter $D_1$ of about 30 inches and the small sheave a diameter $D_2$ of 15 inches. For an average cable of 0.5 inch diameter and allowing for a variation of 20%, i. e. $\pm 10\%$ due to wear or other causes, the difference $d - \bar{d}$ will at most be 0.05 inch. Then the maximum error for this cable will be

(11) $$\frac{L - L'}{L} = \frac{(.05)^2}{30 \times 15} = 5 \times 10^{-6} = 0.0005\%$$

In this example, the maximum error would be less than 1 foot in 20,000 feet. It is noted that by adding a second sheave, the error is diminished by the factor $$\frac{d - \bar{d}}{D_2} = \frac{1}{300}$$

and the accuracy is therefore increased by a factor of 300.

In the exact expression for cable length L as given in Equation 4, the diameters $D_1$ and $D_2$ of the two sheaves enter only in the difference $D_1 - D_2$. To compensate for changes in $D_1$ and $D_2$ due to temperature variations, it is only necessary to keep $D_1 - D_2$ constant. This may be accomplished by making the sheaves of metals having temperature expansion coefficients whose ratio is the same as that of the diameters of the sheaves. Assuming a ratio $$\frac{D_1}{D_2} \text{ of } 2$$

the difference $D_1 - D_2$ will remain substantially constant when the sheaves are made of two metals having temperature expansion coefficients whose ratio is substantially 2. For example, if $D_1$ is 30 inches and $D_2$ is 15 inches, sheave 13 may be made of cast iron having a coefficient of linear expansion of $5.9 \times 10^{-6}$ in/° F. and sheave 14 may be made of aluminum (138) having a coefficient of $11.9 \times 10^{-6}$ in/° F. The larger sheave, of course, must be made of the metal having the smaller expansion coefficient.

Another factor to consider in keeping $D_1-D_2$ constant is the wear of the sheaves. Wear can be reduced by covering the periphery of the sheaves with discrete arcs 15 of hard steel so that their temperature expansion will be immaterial and they will not wear out too fast. Since the sheaves are large, the wear will not be rapid and their diameters need be checked only at remote intervals. If desired, $D_1-D_2$ may be kept constant by making one of the sheaves adjustable in diameter. Periodically the diameter would be adjusted to compensate for wear.

In the embodiment of this invention shown in Fig. 1, the length is derived in accordance with expression (9) by computer means 16 including gear reduction trains 17 and 18 and a differential 19 of such characteristics that the output shaft gives directly length $L'$. A mechanical coupling 20 from large sheave 13 turning at a rate $N_1$ transmits the output thereof to an end gear of differential 19. The rotation of small sheave 14, making $N_2$ turns, is transmitted by a mechanical coupling 21 to step down gear train 17 having a ratio $K^2$. K is preferably chosen so as to be an integer or a simple fraction in order to simplify the gear system. The rotation of sheave 14, thus reduced by $K^2$, is further transmitted by mechanical coupling means 22 to the other end gear of differential 19. The spider or output gear of differential 19 then provides an output of $$N_1 - \frac{N_2}{K^2} \text{ turns}$$

which is fed by coupling means 23 to step down gear train 18 where it is reduced by the ratio $$1 - \frac{1}{K}$$

Output shaft 24 from gear train 18 is in driving connection with a recorder 25. If the recorder cannot be placed close enough to the system of measuring sheaves for use of a mechanical drive connection, transmitter and receiver selsyns may provide an electrical connection between gear train 18 and recorder 25. Second gear train 18 may, if desired, be included within the housing of recorder 25 or may be included in the recorder constant.

In operation, cable 10 is passed successively over sheaves 13 and 14, and the rotation of the sheaves actuates computer means 16 to differentially combine these rotations to derive indications of the length of the article traversing the sheaves. Recorder 25 receives the output of computer means 16 and is calibrated to yield length $L'$ directly.

Figure 2:
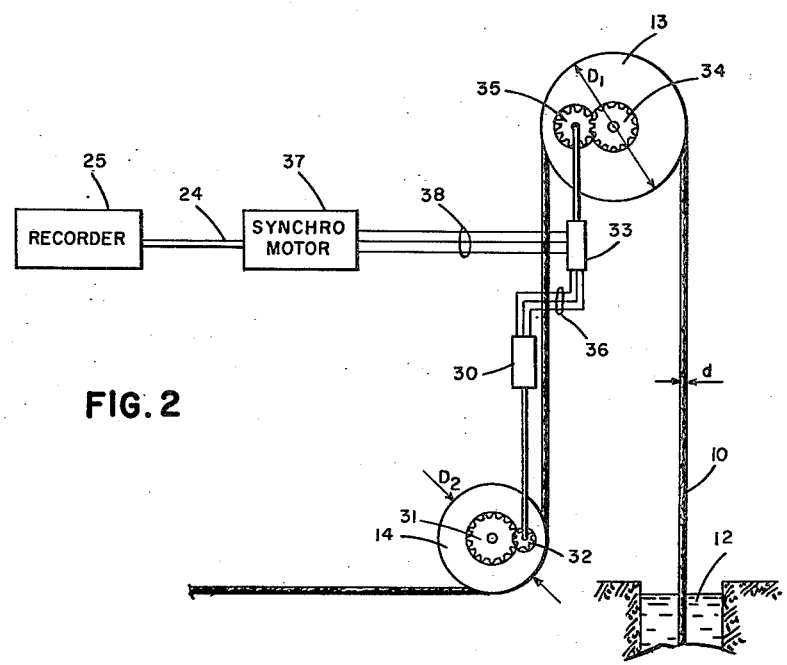
Fig. 2 is a diagrammatic representation of another embodiment of the present invention using an electrical computer for computing the cable travel or length.

Another embodiment of the invention is illustrated in Fig. 2 and involves an electrical computer means which performs the same calculation as the mechanical computer means of Fig. 1, i. e. it measures the length $L'$ in accordance with expression (9). As shown, a synchro generator 30 has its rotor coupled to small sheave 14 by means of step-up gears 31, 32 which have the ratio $$\frac{K(D_1-D_2)}{K-1}$$

A differential generator 33 has its rotor coupled to large sheave 13 by means of step-up gears 34, 35 having the ratio $$\frac{(D_1-D_2)}{K(K-1)}$$

The electrical output from the stator of synchro generator 30 is fed into synchro differential 33 through conductors 36, and the electrical output from synchro differential 33 is transmitted to the stator of synchro motor 37 by conductors 38. By means of shaft 24, synchro motor 37 drives the recorder 25.

In operation, the synchro generators 30, 33 are energized as cable 10 passes over sheaves 13, 14. Synchro motor 37 drives recorder 25 in accordance with the difference between the turns of the rotor for the synchro generator 30 and for the synchro differential 33 to yield the desired indication of length $L'$, as follows:

$$(12) \quad L' = s\left[\frac{K(D_1-D_2)}{K-1}N_1 - \frac{(D_1-D_2)}{K(K-1)}N_2\right]$$

$$= s(D_1-D_2)\left[\frac{N_1 - \frac{N_2}{K^2}}{1-\frac{1}{K}}\right]$$

where $s$ is the sensitivity constant of recorder 25 and equals $$\frac{\pi(D_1+\bar{d})}{D_1-D_2}$$

As a check, it may be desirable to measure directly the number of turns of each sheave by means of counters coupled to each wheel shaft. For example, after the instrument secured to the free end of cable 10 has reached a particular point in the borehole such as the bottom of the borehole, the counters may be read and the exact length L computed by Formula 4 to confirm the depth reading of the recorder.

In Fig. 3 is shown a measuring apparatus employing a computer that may be used for computing the exact length L according to Formula 4. Cable 10, as in the embodiments of Figs. 1 and 2, passes successively over small sheave 14 making $N_2$ turns and large sheave 13 making $N_1$ turns. A mechanical connection 40 is coupled to sheave 13 so as to make $N_1$ turns. Means such as bevel gears 41 having a 1:1 ratio and mechanical coupling means 42 are provided to transmit the rotation of connection 40 to an end gear of a first differential 43. A mechanical connection 44 is coupled to sheave 14 and transmits the rotation thereof to the opposite end gear of differential 43. The output of first differential 43 is then $N_2-N_1$ turns, and this is conveyed by appropriate coupling means 45 to the input of a variable speed drive A, identified by numeral 46, resulting in an output of $K(N_2-N_1)$ turns.

Connection 40 from sheave 13 is also coupled by appropriate gear means 47 having a ratio of 1:1 to one end gear of a second differential 48. The opposite end gear of differential 48 is coupled by mechanical means 49 to the output of variable speed drive A. It is clear that output shaft 50 of differential 48 turns in one direction when $K(N_2-N_1)$ is greater than $N_1$ and in the other direction when $K(N_2-N_1)$ is less than $N_1$. The rotation $N_2$ of sheave 14 is transmitted to the input of a variable speed drive B, identified by numeral 51, by mechanical means 52 having a 1:1 coupling ratio wth connection 44.

To adjust the speed or gear ratio of the variable speed drives A and B simultaneously to the same value K, mechanical coupling means 53 transmits the rotation of the output shaft 50 for the second differential 48 to a common control shaft 54. Rotation of shaft 54 actuates the speed control means of variable drives A and B to reduce K when $KN_1$ is greater than $N_2-N_1$. The feedback is degenerative such that the system reaches equilibrium when $K(N_2-N_1)=N_1$, or $$K=\frac{N_1}{N_2-N_1}$$

Since the output shaft 24 of variable speed drive B transmits $KN_2$ turns to recorder 25, it is apparent that recorder 25 is driven at a rate of $$\frac{N_1N_2}{N_2-N_1} \text{ turns}$$

Recorder 25 may then be provided with an indication which is adjusted in accordance with Equation 4 to indicate the exact length L.

One advantage of measuring cable by the method and apparatus of the present invention is that the need of marks on the cable is eliminated since the sheave system described is definitely free of slippage and has an accuracy at least as good as that of the best measuring tape used for marking the cable. The apparatus can be tested simply once in a while by merely running a flat calibrated tape of arbitrarily chosen length over the sheaves. Of course, this length should be accurately known and the tape should be used under a calibrated tension.

In comparision with cable measuring devices now used in well logging and other well services, the measuring sheave method and devices herein disclosed offer advantages of accuracy, simplicity and low manufacturing and maintenance costs.

Many changes and modifications may be made in the illustrated embodiments by those skilled in the art and, therefore, these embodiments are not meant to be restrictive. Rather the invention is intended to include all such modifications and equivalents as fall within the scope of the appended claims.

I claim:

1. A method of measuring the length of linear articles such as cable or the like including the steps of passing the article successively over two measuring wheels of different diameters, and combining the rotations of said wheels to produce an indication of the length traversing the wheels.

2. A method of measuring the length of linear articles such as cable or the like including the steps of passing the article successively over a small sheave and a large sheave, and differentially combining the rotations of said sheaves to produce an indication of the length traversing said sheaves.

3. A method of measuring the length L of cable or the like comprising the steps of passing the cable successively over two measuring wheels of different diameters, and combining the rotations of said wheels in accordance with the formula $$L = \pi(D_1 - D_2)\frac{N_1 N_2}{N_2 - N_1}$$

to provide a measure of the length traversing the wheels, $D_1$ being the diameter of the larger wheel and $N_1$ the number of turns made thereby, and $D_2$ being the diameter of the smaller wheel and $N_2$ the number of turns made thereby.

4. A method of measuring the length L' of linear articles such as cable or the like including the steps of passing the article successively over two sheaves of different diameters, and combining the rotations of the two sheaves according to the formula $$L' = k\left[\frac{N_1 - \frac{N_2}{K^2}}{1 - \frac{1}{K}}\right]$$

to provide a measure of the length traversing said sheaves, $N_1$ being the turns made by the larger sheave and $N_2$ the turns made by the smaller sheave, K being a constant ratio characteristic of the sheaves and the article, and k being another constant.

5. Apparatus for measuring the length of linear articles such as cable or the like comprising two measuring wheels of different diameters, means for mounting the two wheels whereby the article may be passed successively over each said wheel with substantial arcual contact therewith, and computer means for combining the rotations of said measuring wheels to derive a measure of the length of the article traversing the wheels.

6. Apparatus for measuring the length of linear articles such as cable or the like comprising a relatively small sheave and a relatively large sheave, means mounting said two sheaves on non-coincident axes whereby the article may be passed over said sheaves in succession, and computer means coupled with said sheaves for differentially combining their rotations to derive indications of the length of the article passed thereover.

7. The apparatus of claim 6 including means to maintain constant the difference of the diameters of said small and large sheaves.

8. The apparatus of claim 6 wherein said small and large sheaves are made of metals having coefficients of linear expansion which have the same ratio as that of the diameters of the sheaves, whereby the difference of the diameters remains constant.

9. Apparatus for measuring the length of linear articles such as cable or the like comprising a relatively small sheave and a relatively large sheave, computer means connected to said sheaves which includes multiplying gear means coupled to said small sheave and differential means coupled to said multiplying gear means and to said large sheave, and means for indicating the output of said differential means.

10. Apparatus according to claim 9 including means for maintaining the difference of the diameters of the small and large sheaves constant.

11. Apparatus for measuring the length of linear articles such as cable or the like comprising a small sheave and a large sheave, and computer means connected to both said sheaves including a first step down gear means coupled to said small sheave, a differential coupled to said first gear means and to said large sheave, a second step down gear means coupled to the output of said differential, and indicating means connected to the output of said second gear means.

12. Apparatus according to claim 11 wherein said large sheave turns at a rate $N_1$ and said small sheave turns at a rate $N_2$, said first step-down gear means has a ratio of $K^2$, and said second step-down gear means has a ratio of $1 - 1/K$, K being defined as a constant ratio characteristic of the sheaves and the linear article.

No references cited.